Figure 4:
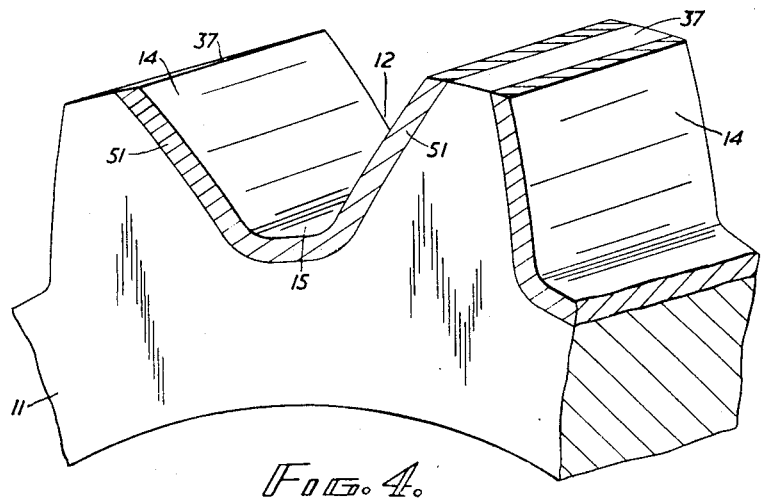

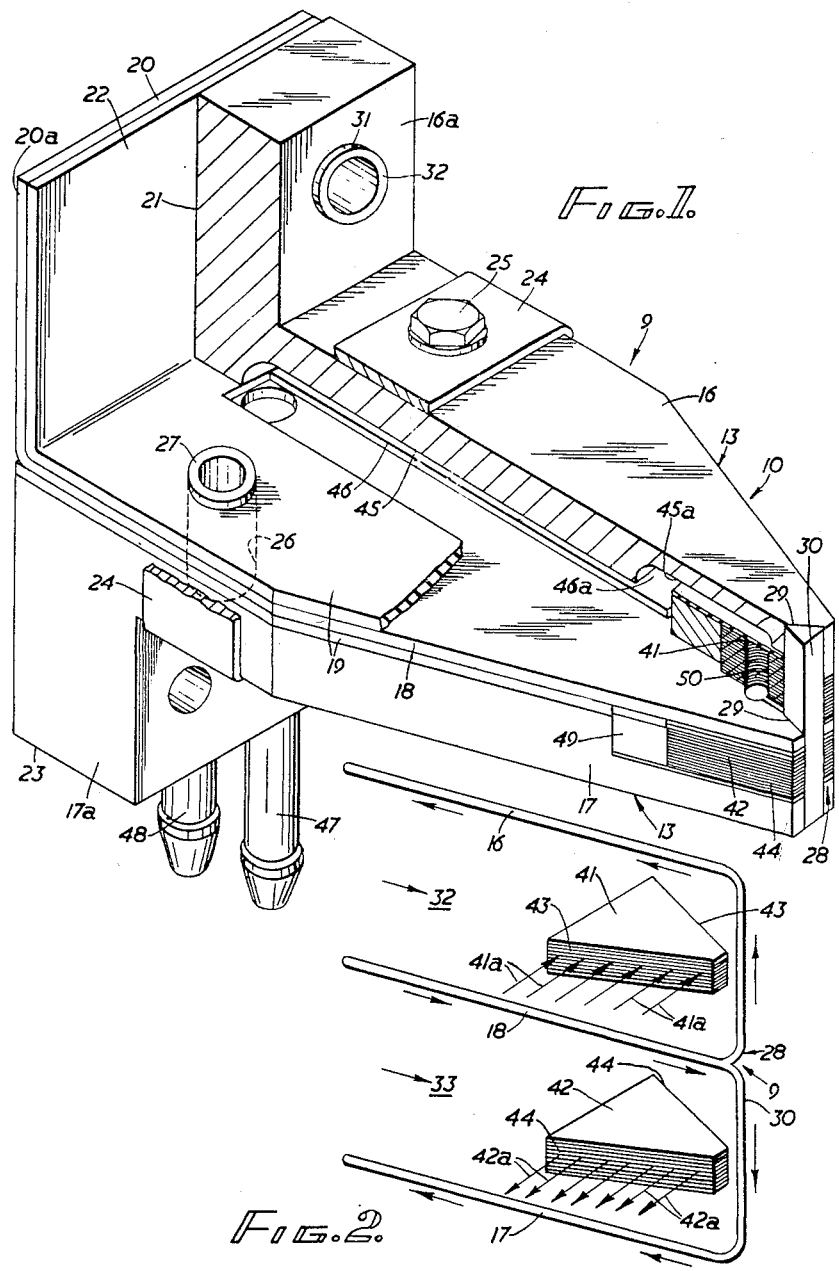

Oct. 15, 1957 D. G. JONES 2,810,054
APPARATUS FOR HEATING TOOTHED OR SERRATED PORTIONS
OF ARTICLES BY HIGH FREQUENCY INDUCTION HEATING
Filed Aug. 15, 1955 2 Sheets-Sheet 2

INVENTOR
David Griffiths Jones
BY Harold F. Leiber
ATTORNEY

United States Patent Office 2,810,054
Patented Oct. 15, 1957

2,810,054

APPARATUS FOR HEATING TOOTHED OR SERRATED PORTIONS OF ARTICLES BY HIGH FREQUENCY INDUCTION HEATING

David G. Jones, Cheltenham, England, assignor to Delapena & Son Limited, Cheltenham, England Application August 15, 1955, Serial No. 528,488

Claims priority, application Great Britain August 17, 1954

11 Claims. (Cl. 219—10.59)

This invention relates to apparatus for heating the toothed portions of toothed articles by high frequency induction heating, the term "high frequency" being used herein to include normal high frequencies, for example, in the region of 10,000 cycles, and also radio frequencies. It is particularly concerned with apparatus of the kind in which an inductor of the high frequency induction heating apparatus is caused to project into a tooth space of the article to lie in close but non-contacting relationship to the flanks and troughs of the teeth defining such space and relative movement between the article and the inductor is effected to cause the tooth space to be scanned by the inductor in a direction longitudinally along the tooth space, i. e. in a direction parallel to the troughs and crests of the teeth.

The invention has for its main object to provide an inductor for induction heating apparatus of the foregoing kind which enables overheating of the edges of the teeth, as the inductor enters or leaves the tooth space, to be avoided. A further object is to provide an arrangement which automatically ensures a lesser heating effect on the crests of the teeth than on the flanks and troughs thereof so that the heat pattern does not spread over the crests and "let down" the adjacent portions of surfaces which have already been heat treated.

According to the invention an inductor for high frequency induction heating apparatus of the foregoing kind comprises a plurality of current-conducting loops or coils arranged side-by-side and around each of which high frequency current flows, the instantaneous direction of the current flowing around each loop or coil being opposite so that the current flowing along two immediately adjacent limbs, or alternatively a common limb, flows along such limbs or limb in the same direction and consequently has an additive effect, approximately twice the amount of current flowing along such limbs or limb as along the outer limbs of the loops or coils, the latter being arranged one behind the other in the direction of said relative movement between the inductor and the article so that heating effects which follow one upon the other are induced along the flanks and troughs of the teeth or serrations as these latter are traversed by the individual coils.

Preferably the inductor comprises only two loops or coils arranged side-by-side substantially in the form of a W, the two outer limbs of which are electrically connected to each other. In such an arrangement the two adjacent sides of the two loops or coils which form the central limbs of the W may be united to form a common central conductor only one end of which is electrically connected to the loops or coils, high frequency current being fed to the free end of such central limb and to the outer limbs of the combined loops or coils.

The two loops or coils are arranged so that they project upwardly from the bottom of the trough of the tooth space, i. e. radially in the case of a gearwheel, the adjacent limbs or common central limb of the two loops or coils being connected to the portions of the duplex loops or coils lying adjacent and parallel to the bottom of the trough. Preferably the three or more upwardly projecting limbs of the loops or coils are of plate- or ribbon-like construction and are of substantially U or V shape so that their inclined sides approximately conform to the contours of the flanks and trough defining the tooth space.

In order to improve the concentration or transmission of the high frequency energy of the inductor to the toothed or serrated surface of the article, each loop or coil of the inductor is preferably provided with a flux-concentrating core. Such core may be constructed of insulated powdered magnetic material—a so-called dust core—or of a ferrite material or alternatively may be formed of thin elongated elements as described in the specification of Patent No. 2,768,269.

Figure 3:
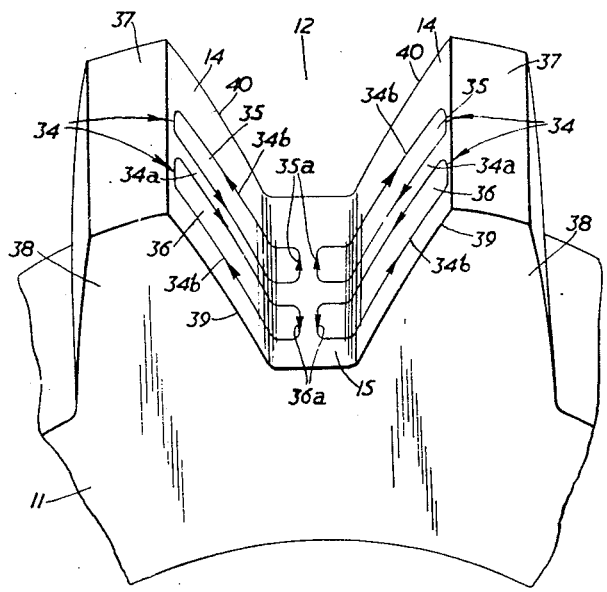

A cored inductor constructed in accordance with the invention and adapted to be projected into a tooth space of the article to be heat treated and be moved relatively to the latter or as to travel along said tooth space from side to side of the article will now be described, by way of example, with reference to the accompanying drawings, in which:

Figure 1 is a perspective view of the inductor, the upper portion of the latter being broken away to show the interior arrangements thereof, Figure 2 is a diagrammatic view indicating the electrical current paths in the inductor shown in Figure 1 and the direction of the flux induced in the cores by such current, Figure 3 illustrates in perspective two adjacent teeth of the article and the current paths of the electrical currents induced in adjacent flanks of such teeth by the inductor, and Figure 4 shows in perspective the hardness pattern resulting from the air- or liquid quench-hardening of the portions of the article heated by the induced currents indicated in Figure 3.

Referring to Figures 1 and 2 of the drawings, the inductor 9 shown therein comprises a body portion 10 of substantially V shape in plan form so that it may be projected into a tooth space of the article to be treated, for example the gearwheel 11 a portion of which is shown in Figures 3 and 4, and substantially conform in cross-section to the shape of a tooth space with the inclined sides 13 of the inductor conforming approximately to the tooth flanks 14 and trough 15 defining the tooth space. The inductor 9 comprises two plate-like spaced copper outer conductors 16, 17 of substantially similar plan form and a common central conductor 18, also of copper, sandwiched between said outer conductors and insulated therefrom by thin insulating plates or sheets 19, for example of mica, interposed between the central conductor and the outer conductors. As shown in Figure 1, the outer conductors 16, 17 are of L shape when considered in longitudinal cross-section and are placed back to back. Thus, end portions 16a, 17a, project outwardly from their wider ends, the upper conductors 16 being slightly shorter than the lower conductor 17. At its wider end the central conductor 18 is turned upwardly, as shown at 20, to lie parallel to the vertical end face 21 of the upstanding end 16a of the upper conductor from which it is insulated by an insulating plate 22, the arrangement being such that the outer end face 20a of the central conductor is flush with the vertical end face 23 of the outwardly projecting end 17a of the lower conductor.

A conductor band 24 encircles the conductor body 10 and electrically connects the two outer conductors 16, 17 to each other, and clamping bolts 25 pass through the holes 26 drilled in the outer conductors and the central conductor 18 to hold the assembly together, insulating bushes 27 being inserted in the holes in the central conductor to insulate the latter from the bolts. At the narrow nose end 28 of the inductor 9 V-shaped grooves 29 are formed in the central conductor 18 and the upper and lower outer conductors 16, 17 to accept a nosepiece 30 of copper which is brazed to the three conductors to electrically connect these latter.

Electrical current from a high frequency source is fed to the central conductor 18 and the two outer conductors 16, 17, for example by bolting the end faces 20a, 23 of the inductor body on to a high frequency transformer, not illustrated, by bolts passing through holes 31 drilled in the ends 16a, 17a and 20 of the outer conductors and central conductor so that the end face 20a of the central conductor and the end face 23 of the lower conductor 17 make contact with the ends of the transformer secondary band, the hole in the end of the upper conductor 16 having an insulating bush 32 inserted therein to prevent a short circuit at this point.

It will be seen that the instantaneous flow of current at any given moment in the inductor 9 is as shown diagrammatically in Figure 2, high frequency current from the transformer flowing for example outwardly along the central conductor 18, and upwardly and downwardly along the nosepiece 30 and returning to the high frequency transformer along the upper and lower outer conductors 16, 17. Thus the inductor 9 in effect comprises two open loops or coils 32, 33 arranged adjacent on another in side-by-side coplanar relationship and having a common central limb formed by the central conductor 18, current flowing round the upper and lower loops, 32, 33 in opposite directions and substantially twice the amount of current flowing along the central conductor as along either the upper or lower conductor.

Since the inductor 9 when projected into the tooth space 12 induces in the adjacent surfaces of the flanks 14 and trough 15 a flow of current, and therefore a heating effect, along a path substantially corresponding to the path of the current through the inductor, it follows that the heating pattern on each flank of the tooth space is in the form of duplex loops 34, arranged substantially in the form of a figure 8, as shown in Figure 3. From this latter figure it is clear that each separate loop 35, 36 of each of the duplex loops 34 extends from the crest 37 of a tooth 38 bounding the tooth space 12 downwardly along the flank 14 of the tooth to the trough 15, the adjacent ends 35a, 36a of the separate loops being in close proximity along the trough. Owing to the additional amount of current flowing along the common central conductor 18 of the inductor 9 substantially four times the amount of heat is generated in the portions of the tooth flanks 14 and trough 15 defining the tooth space 12 immediately adjacent the central conductor as in the portions of the flanks and trough adjacent the outer conductors 16, 17. Thus the central portion or limb 34a of each duplex heating pattern loop 34 induces substantially four times the amount of heat induced by the end limbs 34b of such duplex loop. Such increased heating effect by the central conductor 18 does not become operative, however, until substantially the entire length of the inductor body 10 has entered the tooth space 12 from one end thereof, since until such entry is effected the duplex loops 34 are not induced in the flanks 14.

Owing to the heating pattern induced, as the inductor 9 enters the tooth space 12 only one quarter of the heat is induced in the edges 39 of the teeth at the end of the teeth by which the inductor enters the tooth space as is subsequently induced along the tooth flanks 14 by the central conductor 18 of the inductor when the latter has completely entered the tooth space, the heating effect diminishing in a similar manner as the inductor starts to leave the opposite end edges 40 of the teeth. The use of an inductor constructed in accordance with the invention therefore, positively enables overheating or burning of the edges 39, 40 of the teeth 38, 38 to be avoided.

It will be seen that the adjacent lower portions 35a, 36a of each duplex heat pattern loop 34 lie along the bottom of the trough 15 so that the heating effects of the heat pattern loops are additive along the trough of the tooth space 12 and ensure adequate heating along the trough. The contours of the inclined sides 13 of the inductor body 10 are arranged so that the clearance between the sides of the inductor body and the flanks 14 of the teeth 38, 38 near their crests 37 is slightly greater than the clearance between the nose end 28 of the inductor and the trough 15 of the tooth space, such clearances being, for example, of the order of .030" and .010".

Towards the crests 37 of the adjacent teeth 38, 38 defining the tooth space 12 the duplex heat pattern loops 34 induced in each flank 14 by the inductor 9 are separated by the width of the tooth space, in consequence of which no additive heating effect is derived at the crests. As a result only approximately half the heating effect is produced along the crests 37, 37 of the teeth 38, 38 as would be produced along such crests by an orthodox form of inductor capable of inducing an amount of heat along the flank 14 of the tooth comparable to the heat induced by the central conductor 18 of the present inductor.

It will be appreciated that before the inductor 9 is introduced into the tooth space 12 the material of the gearwheel 11 surrounding such tooth space is cold, such material becoming heated as the tooth space is traversed longitudinally by the inductor. As a result the edges 39, 39 of the teeth 38, 38 at the side of the gearwheel 11 by which the inductor 9 enters the tooth space 12 become heated to a lesser extent than the edges 40, 40 at the side by which the inductor leaves the tooth space. Such unequal heating effects at the opposite edges 39, 40 of the teeth 38, 38 are overcome, according to a further feature of the invention, by constructing the outer conductors 16, 17 of the inductor of unequal widths, the width of the first outer conductor to enter the tooth space 12 being greater than that of the trailing outer conductor so that greater heat is imparted by the wider conductor to the edges 39, 39 of the teeth 38, 38 on the side by which the inductor enters the tooth space than is imparted to the already heated edges 40, 40 of the teeth by the narrower trailing outer conductor as the inductor leaves the tooth space.

In order to improve the concentration of the high frequency energy by the inductor body 10 on the tooth flanks 14 and troughs 15 of the gearwheel 11, each loop or coil 32, 33 of the inductor is provided respectively with a flux-concentrating core 41, 42. Such cores may be constructed of insulated powdered magnetic material—so-called dust cores—or a favorite material or, as in the example illustrated, may be formed of thin elongated elements as described in the specification of Patent No. 2,768,269. Each of the individual cores 41, 42 are formed from thin laminae insulated from each other, each individual lamina being of truncated V-shape in plan form and arranged horizontally so that its inclined sides are aligned with the inclined sides 13, 13 of the inductor body 10. Thereby the cores 41, 42 provide work faces 43, 44, as shown in Figure 2. The flux paths in the cores 41, 42 are as shown by the arrows 41a, 42a in that figure.

As shown clearly in Figure 1, the lower surface of the upper outer conductor 16 is formed with an elongated cut-away portion 45, a similar cut-away portion being formed on the upper surface of the lower outer conductor 17 to form a space 46 within the inductor body 10 through which flows a fluid coolant which enters such space through an inlet pipe 47 and escapes through an outlet pipe 48. Towards the nose end 28 of the inductor body 10 the depth of the cut-away portion 45 is increased, as shown at 45a, to form a space 46a of increased depth in which the cores 41, 42 are mounted and positioned by wedges 49, so that coolant can flow round the cores to cool these latter, such coolant flowing through a channel 50 formed in each core by providing each individual lamina with a keyhole-shaped aperture the narrow end of which merges into the V-shaped grooves 29.

When the upper and lower conductors 16, 17 are of different widths as already described, the cores 41, 42 will also be of the appropriate differential widths. It has been found that when using a cored inductor having a leading core of greater width than the trailing core, as already mentioned, for the heat treatment of gearwheels of small diametral pitch, the additional advantage accrues that the tendency for the heat induced in the edges of the crests of the teeth as the inductor enters and leaves the tooth space to be insufficient to raise such edges to the required temperature is automatically overcome.

Figure 4 illustrates diagrammatically at 51 the hardness pattern produces along the tooth flanks 14, 14 and trough 15 by the foregoing heating of these latter by the inductor 9 shown in Figure 1 followed by the usual air- or liquid-quenching operation. It will be seen that the hardness pattern 51 is of substantially even depth along the trough 15 and lower portions of the flanks 14, 14, the hardness pattern, however, tapering upwardly towards the crest 37 of each tooth 38.

For the heat treatment of toothed or serrated articles in which the width of the tooth spaces is considerable in proportion to their length, as in chain sprocket wheels, for example, the two loops or coils 32, 33 of the inductor 9 may be curved or otherwise shaped to conform to the contours of the flanks and trough of the adjacent teeth defining the tooth space. Relative movement between the article and the inductor may be effected so that the inductor moves longitudinally of a tooth space, as in the previously described arrangement, the two loops or coils 32, 33 being, however, turned through 90° about a transverse axis and curved so that the outer limbs closely conform to and are spaced outwardly from the contours of the flanks and trough of adjacent teeth, the common central limb being symmetrical with the tooth space.

I claim:

1. An inductor for high frequency induction heating apparatus of the kind set forth comprising two current-conducting loops or coils arranged side-by-side in the form of a W to have a common central limb and around each of which high frequency current flows in such manner that the instantaneous direction of the current flowing around one loop is opposite to that of the current in the other loop, and a separate flux-concentrating core arranged between the limbs of each loop, whereby the heating pattern induced on the article is in the form of loops extending from the trough of a tooth space upwardly along the flanks of the adjacent teeth defining such tooth space and the heating effect of the adjacent ends of the loops in the trough and the adjacent sides of the loops on each tooth flank immediately adjacent said common central limb is additive.

2. For high frequency induction heating apparatus of the kind described, an inductor comprising the combination of a plurality of coils of current-conducting material, said coils having spaced-apart limbs adapted to be connected with a source of high frequency energy so that the instantaneous direction of the current flowing round each coil is opposite, and said coils being arranged adjacent one another in side-by-side coplanar relationship so that the current flowing along adjacent limbs of adjacent coils flows in the same direction and consequently has an additive effect, the polar axes of said coils lying in a common plane and being arranged transversely of the teeth of the article when said tooth space is scanned by the inductor, so that the polar axes of the coils follow one another in the direction of said relative movement and the flanks and trough of the tooth space being scanned are inductively heated first by the leading coil and thereafter by the next succeeding coil of the inductor, the maximum heating effects being obtained only when all of the coils are effectively in electrically-coupled relation with the flanks and the trough defining said tooth space.

3. An inductor according to claim 2, wherein the coils are two in number and are constructed in the form of narrow U-shaped loops arranged substantially in the form of a W, and wherein the limbs of the loops are electrically connected to said source of high frequency energy at a zone remote from the closed ends of the loops whereby the heating pattern induced on each flank of the toothed space being scanned is in the shape of duplex loops arranged substantially in the form of a figure 8 lying on its side.

4. For high frequency induction heating apparatus of the kind described, an inductor comprising in combination two coils of current-conducting material each of substantially U shape and arranged side-by-side substantially in the form of a W with the adjacent sides of the coils united to form a common central conductor only one end of which is electrically connected to the coils which are arranged relatively to the tooth space to be scanned so that their polar axes, which lie in a common plane, are disposed transversely of the teeth and the closed ends of the loops lie adjacent and parallel to the trough of the tooth space, high frequency current being fed to the free end of the central limb and to the outer limbs of the coils so that, when said tooth space is scanned by the inductor, the polar axes of said coils follow one another in the direction of said relative movement and the flanks and trough of the tooth space are inductively heated first by the leading coil and then by the trailing coil, whereby the heating pattern induced on each tooth flank bounding said tooth space is substantially in the form of a figure 8 lying on its side which traverses the respective tooth flank with the inductor.

5. For high frequency induction heating apparatus of the kind described, an inductor comprising in combination three spaced electrically-conductive plate members which are substantially wedge-shaped in outline and are aligned with one another so that their inclined sides approximately conform to the contours of the flanks and trough defining the tooth space to be scanned, said plate members being insulated from each other for the greater portion of their lengths but electrically connected at their narrower ends by an electrically-conductive nosepiece that lies substantially parallel to the trough of said tooth space when the latter is scanned by the inductor, whereby duplex heat pattern loops are induced on each side of the inductor, one duplex loop on each respective tooth flank, the lower portion of each duplex heat pattern loop lying along the bottom of the trough so that the heating effects of the heat pattern loops are additive along the trough of the tooth space and ensure adequate heating along such trough whilst the adjacent sides of the loops on each tooth flank immediately adjacent the central plate member also provide an additive heating effect, the maximum heating effects being attained only when all the plate members are effectively in electrically-coupled relation with the tooth flanks and trough defining the tooth space.

6. An inductor according to claim 5, wherein the substantially wedge-shaped outline form of the plate members is so proportioned with relation to the size and shape of the tooth flanks and trough defining the tooth space to be scanned that the clearance between the edges of the plates and the respective sides of the tooth flanks near the crests of the teeth when the tooth space is being scanned is slightly greater than the clearance near the trough.

7. An inductor according to claim 5, wherein the plate members are of unequal widths whereby to form, in conjunction with said nosepiece, heating coils of unequal widths in the direction of said relative movement, the width of the leading coil to enter the tooth space in the direction of travel being greater than that of the trailing coil so that greater heat is induced in the flanks and trough bounding the tooth space to be scanned by the leading coil than by the trailing coil, maximum heating effects being attained only when both coils are effectively in electrically-coupled relation with said flanks and trough.

8. For high frequency induction heating apparatus of the kind described, an inductor comprising in combination a plurality of coils of current-conducting material, said coils having spaced-apart limbs adapted to be connected with a source of high frequency energy so that the instantaneous direction of the current flowing round each coil is opposite, and said coils being arranged adjacent one another in side-by-side coplanar relationship so that the current flowing along adjacent limbs of adjacent coils flows in the same direction and consequently has an additive heating effect, the polar axes of said coils lying in a common plane and being arranged transversely of the teeth of the article when said tooth space is scanned by the inductor so that polar axes of the coils follow one another in the direction of said relative movement and the flanks and trough of the tooth space being scanned are inductively heated first by the leading coil and thereafter by the next succeeding coil of the inductor, and each of said coils having an individual core of flux-concentrating material arranged between the limbs of the coil and extending in the direction of the polar axes of the coil to provide a work face on each side of the inductor substantially coplanar with the respective end face of the associated coil.

9. For high frequency induction heating apparatus of the kind described, an inductor having a body comprising in combination three spaced electrically-conductive plate members each of which are substantially wedge-shaped in outline and are aligned with one another so that their inclined sides approximately conform to the contours of the flanks and trough defining the tooth space to be scanned, said plate members being insulated from each other for the greater portion of their lengths but electrically connected at their narrower ends by a nosepiece that lies substantially parallel to the trough of said tooth space when the latter is scanned by the inductor, thereby to form two U-shaped coils with the central plate member serving as a common conductor for both coils, and a separate core of magnetic material disposed between the limbs of each of said coils for concentrating the flux thereof, said cores extending across the width of the plate members in the direction of the polar axis of the respective coil and providing a work face at each end of each coil substantially coplanar with the sides of the plate members.

10. An inductor according to claim 9, wherein the body of the inductor is hollow and means are provided for supplying fluid coolant to the interior of the body so that such coolant is brought into direct heat-exchanging contact with each coil.

11. An inductor according to claim 9, wherein the cores are composed of relatively thin elements of magnetic material each insulated from the other and from the plate members.

References Cited in the file of this patent
UNITED STATES PATENTS

| | | |
|---|---|---|
| 2,493,950 | Dow et al. | Jan. 10, 1950 |
| 2,672,544 | Finchelstein et al. | Mar. 16, 1954 |

FOREIGN PATENTS

| | | |
|---|---|---|
| 141,546 | Sweden | Aug. 4, 1953 |